A. URBAHN.
Silk-Beating and Washing-Machine.
No. 223,261. Patented Jan. 6, 1880.
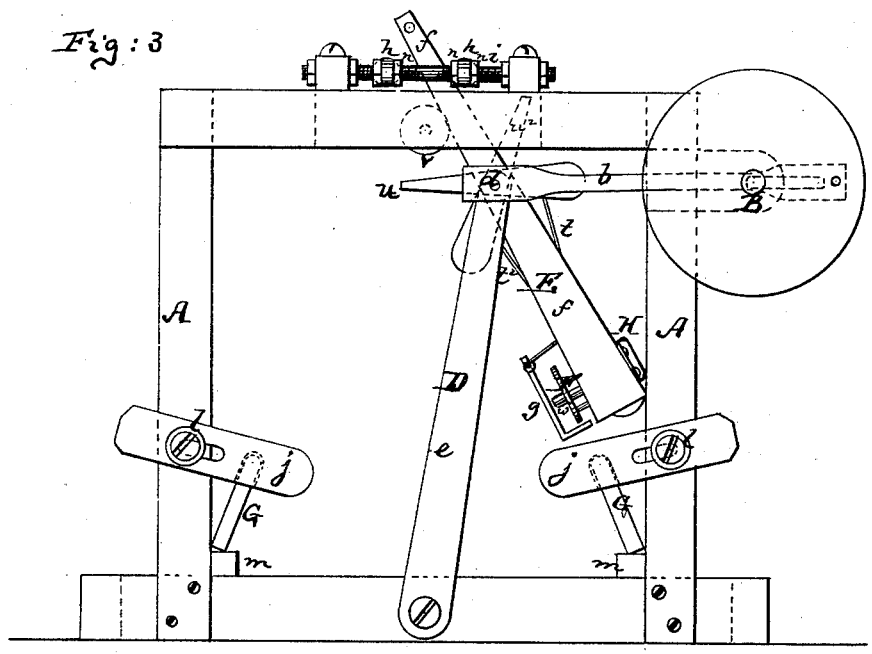
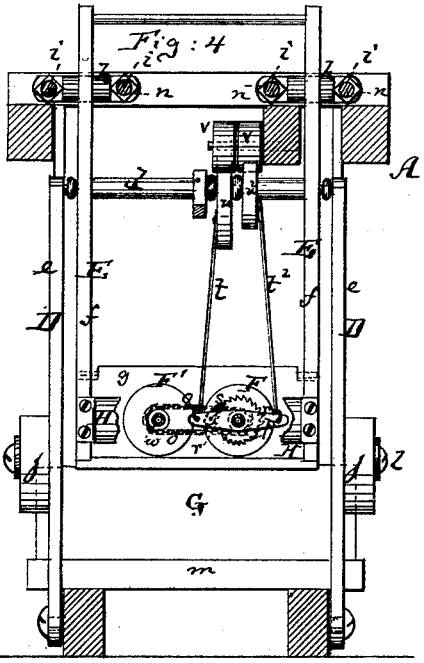
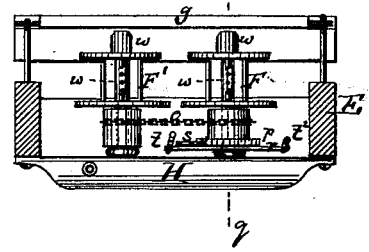
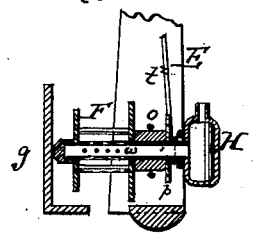

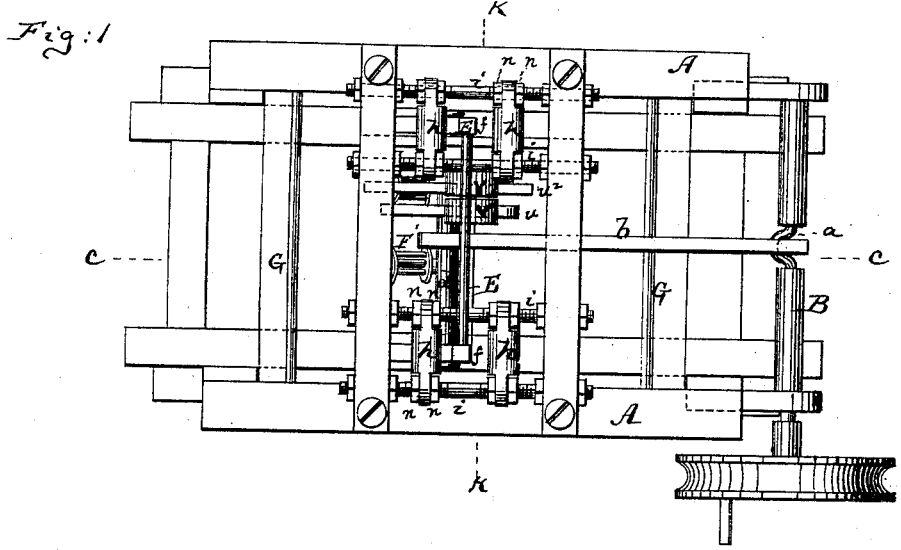

UNITED STATES PATENT OFFICE.

ALWILL URBAHN, OF PATERSON, NEW JERSEY, ASSIGNOR TO JACOB WEIDMANN, OF SAME PLACE.

SILK BEATING AND WASHING MACHINE.

SPECIFICATION forming part of Letters Patent No. 223,261, dated January 6, 1880.

Application filed October 30, 1879.

*To all whom it may concern:*

Be it known that I, ALWILL URBAHN, of Paterson, in the county of Passaic and State of New Jersey, have invented a new and Improved Silk Beating and Washing Machine, of which the following is a specification.

Figure 1 is a plan or top view of my improved silk beating and washing machine. Fig. 2 is a vertical longitudinal section of the same on the line $c\ c$, Fig. 1. Fig. 3 is a side elevation of the same; Fig. 4, a vertical cross-section thereof on the line $k\ k$, Fig. 1. Fig. 5 is a detail horizontal section on the line $c\ k$, Fig. 2; Fig. 6, a detail vertical section on the line $q\ q$, Fig. 5.

The object of this invention is to produce a machine for beating and washing spun and other silk after the same has been dyed.

Silk dyed in skeins, especially black silk, carries manifold impurities, which can only be removed by careful beating and simultaneous washing. Usually this is done by hand, because it appeared difficult to devise machinery for giving that quick and powerful stroke required in the beating. The stroke must be sharp and sudden, like the cracking of a whip. This effect I produce by a peculiar vibrating mechanism, which carries the skeins of silk, and which mechanism constitutes the essential feature of my invention.

The invention also consists in mechanism for imparting intermittent rotary motion to the risers or spools from which the silk is suspended in the use of adjustable beating blades or stones; in a novel arrangement of water-channels for throwing jets of water through the hollow shafts of the risers or spools upon the silk suspended therefrom, and in other details of improvement, hereinafter more clearly pointed out.

In the accompanying drawings, the letter A represents the frame of the machine. B is the driving or operating shaft, to which rotary motion is imparted by suitable means. A crank, $a$, of this shaft connects by a rod, $b$, with the upper cross-bar, $d$, of a swinging frame, D. The uprights $e\ e$ of said frame D are pivoted at or near their lower ends to the frame A, as shown. By rotating the shaft B the frame D is vibrated on its pivots to swing forward and backward in the machine.

To the cross-bar $d$ of the frame D are pivoted the uprights $f\ f$ of another frame, E, which, in its lower part, carries the spools or risers F F', either one or more. These spools or risers are hung in the box-shaped lower part of the frame E, their axes being at right angles to the shaft B, or, in other words, longitudinally placed in the machine. One side, $g$, of the box-shaped lower part of the frame E is hinged, so that it can be swung off the spools to permit the ready placing of skeins of silk to be beaten upon and their removal from said spools.

The upper parts of the uprights $f\ f$ of the frame E extend upward above their pivotal cross-bar $d$, and enter cavities that are formed by adjustable cross-blocks or abutments $h\ h$, which are secured in the upper part of the frame A. Above the frame A the uprights $f\ f$ are connected by one or more suitable cross-pieces.

The abutting-pieces $h\ h$ are fitted upon longitudinal rods $i\ i$, upon which they are adjustable at any suitable distance apart, so that by said adjustment the beating-power of the silk-carrying frame E may be regulated.

The silk being suspended in skeins from the spools F, and motion imparted to the shaft B, it follows that the frame D is vibrated, as already set forth.

The frame D carries the pendulum-frame E with it, and as the upper portion of the frame E is confined between the abutments $h$, said frame E derives a double vibrating motion, partly on the pivots of the frame D, partly on its own pivots $d$.

The motion on the pivots $d$ is regulated by the spacing of the abutments in such manner that it is the more pronounced and violent the closer these abutments are set together, and less prominent if the abutments are set farther apart.

Whenever in its vibration the upper part of frame E comes in contact with the abutments its lower part receives a smart sudden impetus in the direction of its motion, and carries the suspended silk with a sharp blow against the edge of the beating blade or stone G. There are, preferably, two such beating blades or stones, G, placed in the lower part of the frame A, one near each end of the same, so that the silk will be beaten in its forward movement as well as on the return motion.

The blades G rest on base-blocks $m\ m$, and are, at their upper ends, held by hooks $j\ j$ at the proper angle of inclination. These hooks $j\ j$ are slotted and held by screw-bolts $l\ l$, so that they may be adjusted to properly vary the angles and position of the blades.

The abutting-blocks $h\ h$, hereinabove referred to, are held on the rods $i\ i$ by nuts $n\ n$, or otherwise so locked as to be secure and yet adjustable. These abutments are shown to be rigid bars of iron; but for many cases it may be desirable to make them more or less elastic or springy to increase the effect of the sharp blow.

Two spools, F F', are shown in the frame E. Any other number may be used. If two or more are used in the same frame they should be united by an endless chain or belt, $o$, or equivalent devices, in such manner that rotary motion imparted to one will be imparted to all.

One of the spools carries a ratchet-wheel, $p$, and a loosely vibrating lever, $r$, to which a pawl, $s$, bearing against the toothed edge of the ratchet-wheel, is pivoted.

The ends of the lever $r$ are, by rods $t\ t^2$, united to levers $u\ u^2$, respectively, which said levers are pivoted to the cross-bar $d$. One of said levers, $u$, projects forward, the other, $u^2$, backward, as shown.

During the vibratory movement of the frame E the levers $u\ u^2$ are alternately carried under friction-rollers $v$, that are hung to the frame A, and by such contact said levers are vibrated to pull the rods $t\ t^2$ alternately upward, thereby vibrating the lever $r$. The lever with its pawl is thus moved to impart intermittent rotary motion to the ratchet-wheel $p$ and to the spool to which the same is affixed.

All the spools being united by the chain $o$, they all partake of the same intermittent rotary motion. The skeins of silk suspended from the spools are consequently gradually turned thereon, so that at each stroke of the beater a fresh portion of the silk is exposed to the blade.

It is desirable, and in most cases necessary, that the silk should be in a moist condition while being beaten. To this end I provide the spools or risers with hollow shafts $w$, which hang at one end in a water-tank, H, which constitutes one side of the box-shaped lower part of the frame E. This tank is constantly supplied with water or other proper liquid through an elastic-pipe, which connects it with a suitable supply-reservoir. The tank H communicates, through the open ends of the tubular shafts $w$, with the interior of said shafts, and the water thus supplied to said shafts in a constant stream is thrown upon the silk through small holes which are drilled into said shafts $w$, as indicated in Fig. 6. Thus the silk is moistened while being beaten and consequently washed.

I have described this machine as being applicable to the beating of silk, for which it is particularly intended; but the invention will also be useful for beating other than silken fiber, and also for washing the same. The details of the mechanism may be varied without departure from the spirit of my invention.

I claim—

1. In a machine for beating silk, the combination of the vibrating frame D and the skein-carrying frame E, pivoted to the former, with the abutments $h\ h$, for the purpose of giving sharp blow-like terminal movements to the skeins, substantially as herein shown and described.

2. In a machine for beating silk, the combination of the vibrating frame D and loosely-suspended frame E with the abutments $h\ h$ and one or more beating-blades, G, substantially as herein shown and described.

3. In a machine for beating silk, the abutments $h\ h$, rods $i\ i$, and adjusting and locking devices, in combination with the uprights of the frame E and the frame D, substantially as herein shown and described.

4. In a machine for beating silk, the beating-blade G, in combination with the base-block $m$ and adjustable holders $j$, substantially as herein shown and described.

5. In a machine for beating silk, the frame E, combined with one or more spools or risers, F, and with the frame D and abutments $h\ h$, substantially as herein shown and described.

6. In a machine for beating silk, the combination of the frames D and E and spool or spools F with the movable plate $g$, substantially as herein shown and described.

7. In a machine for beating silk, the combination of the frames E and D and spool F with the ratchet-wheel $p$, pawl-carrying lever $r$, rods $t\ t^2$, levers $u\ u^2$, and contact-pieces $v$, substantially as herein shown and described.

8. In a machine for beating silk, the combination of the frames D E, the latter carrying two or more spools, F F, with mechanism for turning one spool, and with the belt or chain $o$, connecting all of said spools, substantially as herein shown and described.

9. In a machine for beating and washing silk, the combination of the fiber-carrying spool F and its hollow perforated shaft $w$ with the tank H, and with the vibrating frame E, in which said spool or tank is secured, and with the frame in which the frame E is hung, substantially as herein shown and described.

10. A combined beating and washing machine constructed, essentially, of vibrating frames D and E, the spools F, of one or more beating-blades, G, and of a sprinkling-tank, H, and perforated shaft or shafts, in combination with mechanism for vibrating said frame, spools, and tank, substantially as herein shown and described.

ALWILL URBAHN.

Witnesses:
TOMPSON B. MOSHER,
JAMES TURK.